Dec. 15, 1936.   J. H. DAVIS   2,064,522
METHOD OF AND APPARATUS FOR TREATING MATERIALS
FOR THE DESTRUCTION OF INSECT LIFE THEREIN
Filed Dec. 10, 1931   3 Sheets-Sheet 2
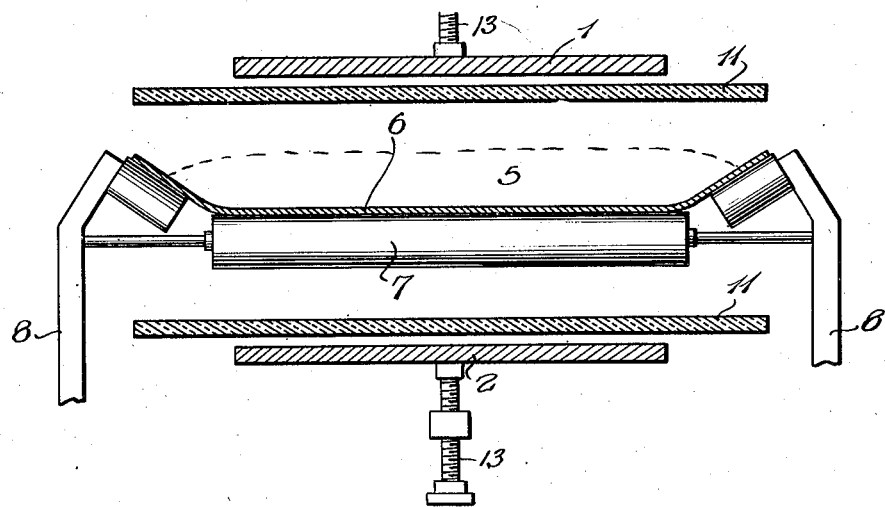
Fig. 2
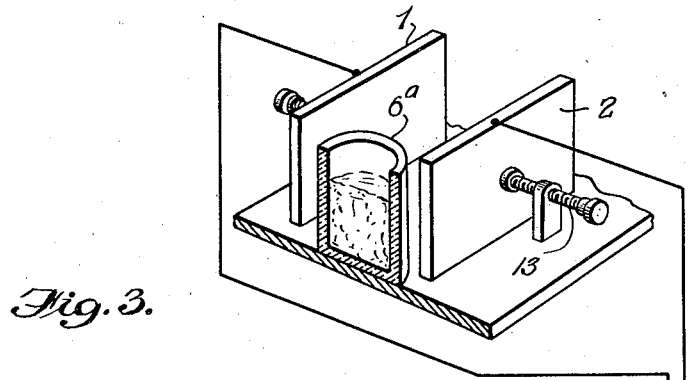
Fig. 3.
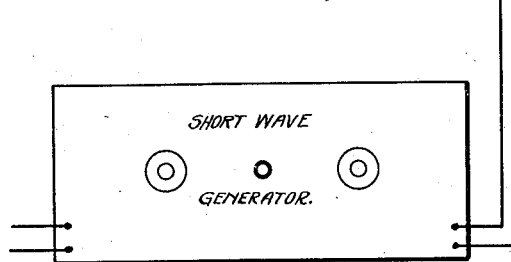
SHORT WAVE GENERATOR.
Inventor
Jesse H. Davis.
By
Attorney Dec. 15, 1936.    J. H. DAVIS    2,064,522
METHOD OF AND APPARATUS FOR TREATING MATERIALS
FOR THE DESTRUCTION OF INSECT LIFE THEREIN
Filed Dec. 10, 1931    3 Sheets-Sheet 3

Inventor
Jesse H. Davis
By Jensen S. Clarkson
Attorney

Patented Dec. 15, 1936

2,064,522

UNITED STATES PATENT OFFICE 2,064,522

METHOD OF AND APPARATUS FOR TREATING MATERIALS FOR THE DESTRUCTION OF INSECT LIFE THEREIN

Jesse H. Davis, Baltimore, Md.

Application December 10, 1931, Serial No. 580,170

35 Claims. (Cl. 21—54)

This invention relates to a method of and apparatus for treating grain, growing plants or vegetation generally, or other materials or substances, for the destruction of insect life therein, by means of high frequency electrical oscillations.

Great losses are caused railways, steamship lines and other shippers, graineries and other storage houses, farmers and other producers, as well as merchants and the public generally, as a result of the partial or complete destruction or quality impairment of wheat, rice or other grains, tobacco, peas, beans, packed cereals, manufactured or growing cotton or growing plants or other vegetation generally, flour, wool or woolen goods, and other materials or substances, due to the depredations of the weevil, moth and other like injurious insects and their larvae which prey upon such materials or goods.

The destruction of such insects has heretofore been effected or attempted by the use of poison insecticides, applied by spray or fumigation, or by the use of applied heat of destructive temperature, or by corona action, i. e., electrical disruptive discharges, all of which are either uncertain or unreliable or are open to known objections, or are impossible of use in treating certain materials. It is known, for example, that insects infesting grain will succumb if exposed the proper length of time to temperatures in the region of 130° F. more or less. Such temperatures can, of course, be obtained by passing the infested grain through suitable grain driers. This, however, causes a considerable shrinkage in the weight of the grain and therefore is not favorably regarded by the grain trade except where it is essential to dry the grain so that it may be preserved. Inasmuch as certain species of grain weevil deposit their eggs in the kernel of the grain, it is, of course, necessary to elevate the temperature of the entire grain sufficiently to destroy the eggs, larvae or pupae, during which process the grain will suffer a material reduction in weight on account of loss of moisture content. Grains, breakfast foods and cereals generally can not be treated by subjecting them to a spraying action or fumigation with poisonous substances, for obvious reasons, and, therefore, all of these measures are objectionable or incapable of use. An electrical method, involving corona action of disruptive electrical discharges through the material, has been employed, but this method has attained no commercial importance except in the treatment of rolled oats and certain other breakfast foods, as due to the tendency of the electric energy in disruptive discharges to follow the surfaces rather than to penetrate the body of the material, this method is not wholly reliable. Furthermore, any method involving disruptive discharges of electric energy can not be used in grain elevators and other like storage places for treating grain and similar materials, where dust or inflammable substances are present on account of the possibility of explosions or fire hazard. Cotton, leather, woolen or other goods are likewise subject to attack by insects and their larvae and various methods of treating the goods to destroy the insects are employed. Because of the unreliability and inefficiency of all such methods, however, or their incapability of use without some practical objection, such as fire hazard, tainting of the material or excessive cost, millions of dollars worth of grain, prepared cereals, cotton, wool and other materials are annually destroyed by insect depredation, to which losses must be added the expenses involved in re-handling, fumigating, and keeping the grain or other material at a low temperature or otherwise treating the same in an effort to reduce or minimize the evil effects of these pests.

The main object of my invention is to provide a method of treating insect infested materials or substances in bulk by the action of high frequency oscillations thereon produced by an oscillation value high frequency generator, whereby such insects and their larvae may be economically and reliably destroyed without fire hazard or tainting or injury of any character to the material treated.

A further object of the invention is to provide a method whereby high frequency oscillations of the character described of certain frequencies may be employed in such manner as to secure the best results.

A still further object of the invention is to provide an apparatus of simple type including a vacuum tube high frequency oscillation generator for carrying the method into practical effect.

In the accompanying drawings, showing one of many possible means for carrying my invention into practical effect,—

Fig. 2 is a transverse section through the conveyor and oscillation field.

Fig. 3 is a view of a modification showing a different mode of holding and exposing the material to treatment.

Figure 1:
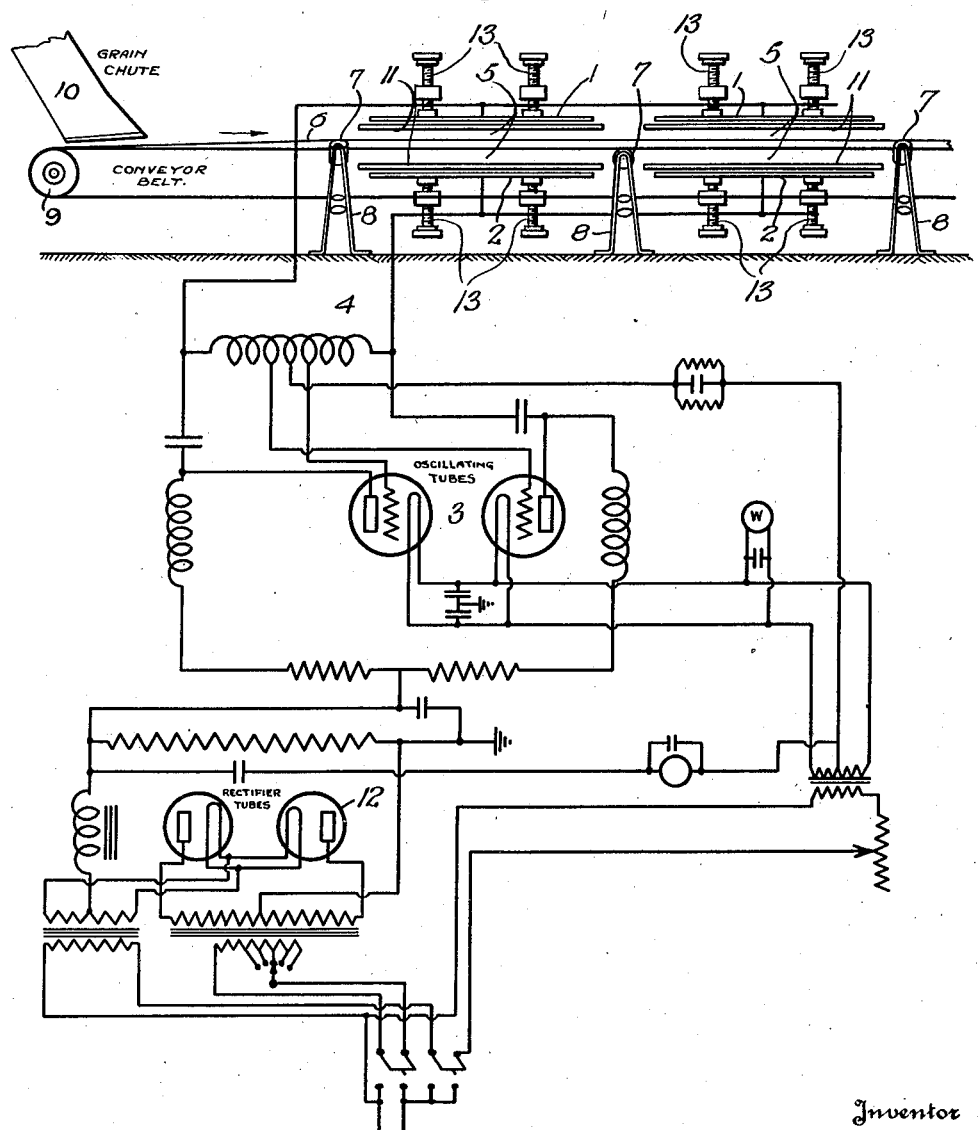
Fig. 1 is a fragmentary side elevation, with parts in section, of a grain conveyor and a high frequency oscillation generator as employed in connection therewith for treating insect infested grain, a schematic diagram of the generator circuits being disclosed.

Referring now more particularly to the drawings, 1 and 2 represent pairs or sets of superposed conductor plates or platens, which may be relatively fixed or adjustable, forming the electrode terminals of high frequency oscillators 3 of the oscillation circuit 4 of an oscillation valve high frequency generator, the plates 1 and 2 of each pair being spaced to provide a high frequency space discharge gap or field 5 the width of which may be varied by adjustment of the electrode terminals. Through this field travels the working stretch of a traveling grain holder or conveyor belt 6, which belt is supported for movement over pulleys or rolls 7 on a supporting frame 8 and passes at one end about a drive pulley or roll 9, receiving driving motion from an electric motor or other source of power, whereby the belt is driven. The said working stretch of the belt is supported in such manner as to concave the belt transversely to adapt it to hold against displacement a layer of grain of desired depth. The grain may be fed to the moving belt from a chute 10, or by other means, and its working stretch, as shown, travels forwardly or in the direction of the arrow, through the field 5 in properly spaced relationship to the electrodes 1 and 2 so as to lie in the path of the high frequency radiations or magnetic waves passing between the platens. In the arrangement shown, two pairs of platens or electrodes are shown, spaced longitudinally a certain distance so that the grain will be exposed at spaced periods to successive high frequency treatment actions, but I may use only a single pair of electrodes or any number of them at desired intervals apart, according to the nature of the material and insects being subjected to treatment. Any suitable means may be employed for adjusting the electrodes of each pair, such as screw shafts 13, as shown in Fig. 2, to vary their spacing. In some instances exposure of the material for a very short time to the field between a single pair of field electrodes may be sufficient, while in other cases the character of the material, i. e., its specific conducting capacity, resistance or impedance to penetration by and passage of the induced current produced by the high frequency of the oscillations, in addition to the resistivity of the insects, may be such as to require a plurality of treatments to secure certain and reliable results. By the arrangement disclosed the material in ordinary course of transit, as while being delivered to or discharged from a grainery or other place, may be treated one or more times, in stages of any suitable duration, with interruptions between, so that all insect life in the material, regardless of state of growth or degree of resistivity to the effects of the high frequency oscillations will be destroyed during a given range of travel of the conveyor belt.

In the action of the apparatus, high frequency electrostatic or electromagnetic oscillations, or radiations of electric energy of high frequency emanating from plates 1 and 2 pass therebetween through the field 5 and through the grain or other material on the belt and lying in the field. Such high frequency electrical oscillations or radio waves or radiations of electric energy induce electric potential and current in the insect infested grain or material treated, whereby eddy currents are formed of sufficient intensity to elevate the temperature of the insects or their eggs, larvae, or pupae to a sufficient degree to destroy the same without injury to the grain or other material or substances treated. Non-conductor (non-metallic) shield plates 11, of glass, micarta or other suitable non-conducting material, are preferably interposed between and spaced from the electrode plates 1 and 2 and the material under treatment to shield and prevent accidental direct physical contact of the material treated with the electrode plates and to increase the efficiency of operation. The high frequency electric oscillations or magnetic radio waves will be more effective in exterminating insects in materials, such as grain, etc., when passed through paper or other cartons or through these non-conductor shield plates than through the air. An effect of high frequency oscillations of the order employed on the glass shields is to cause these shields to be heated. As a result the shields act as heat absorbers and storing agents which during the operation of the apparatus, maintain a reasonably high temperature in the treatment zone or field and thereby reduce the amount of electric energy required to be expended in developing lethal heat in the insects and the time period of treatment required for that purpose. In some cases the material to be treated, as shown in Fig. 3 may be placed in a stationary or movable holder or container 6a, which may be made of glass or other approved insulating material, thus providing a holder of shielding type. Where the substance to be treated is fluent, such substance may be conducted through the high frequency field by causing it to flow through non-conducting tubes or channels disposed in said field.

The drawings show a conventional schematic diagram of a power supply for the generator, assuming that it is of the alternating current type, employing rectifier valves 12 and associated instrumentalities for supplying proper currents for the cathodes and anodes of the oscillator valves. In practice provision is made for varying the frequency of the oscillators from, say, ten million to fifty million or more cycles per second, and thus adjusting the circuit is required for supplying the proper frequency according to the electrical conductivity and other requirements of the grain or other host material or substance and particular kind of insect under treatment.

The high frequency generator employed is one adapted for producing short or ultra-short waves. By short waves are meant those of a band range between 10 meters (about 30,000 kilocycles or 30,000,000 cycles) to 30 meters (about 10,000 kilocycles or 10,000,000 cycles) or more, and by ultra-short waves are meant waves of a band between 10 meters and 6 meters (about 50,000 kilocycles or 50,000,000 cycles) and in some cases as low as 3 meters (about 100,000 kilocycles or 100,000,000 cycles). In general the wave length ranges of from 6 to 30 meters, or frequency ranges of from 50,000 kilocycles to 10,000 kilocycles, will be found sufficient, though frequencies within the maximum and minimum ranges given may be employed. I have found that in treating grain in a thin sheet with frequencies in the order of 55,000,000 and above by the use of a high capacity generator, as one of the character producing oscillations of high electromotive force, all insect life will succumb within one to three seconds.

Extensive study and laboratory and practical working tests made by me show that by producing high frequency oscillations of the order of ten million to fifty million, or possibly in some cases one hundred million cycles per second, and exposing the infested material to be treated to such oscillations, an action will be produced through the effect of eddy currents being induced in the adult insects, eggs, larvae, or pupae sufficient to elevate the temperature of such insects and their progeny to the point where they will succumb to the induced heat. When a generator circuit of the high capacity employed is suitably adjusted with regard to the electrical conductivity of the material treated which, in case of grain and similar materials, is less than that of the insects to be destroyed, and the frequency controlled so as to overcome the resistivity of the material and to place the load in tune or resonance with the frequency, a selective action will be obtained whereby the temperature induced in the treated part of the material will be lower than that induced in the insects. The effect of the induced eddy currents at the frequency employed, therefore, will be to develop by induction in the insect, eggs, larvae or pupae, a temperature of from 110° to 150° F., the most effective temperatures being from 120° to 140° F., at which temperatures the insects, their eggs, larvae or pupae are destroyed without, however, during the limited time required for lethal action at the adjusted frequency and under the high electromotive force employed, inducing such a high temperature in the grain, or a sufficiently high temperature to affect the germinating properties of the grain, which will remain unaffected for the short period to which it is exposed during treatment. My studies and investigations have also indicated that resonance of portions of the insects also assists in elevating the temperature of the insect as well as the induced eddy currents; such resonance being probably due to the natural period of particular appendages to the impressed vibration or frequencies to which they are exposed. This resonation undoubtedly tends to temperature elevation which is additive to the temperature elevation brought about by the induced eddy currents. The period of treatment for destroying insect life in bulk grain varies to certain degrees dependent upon the electrical conductivity of the grain and insects and the frequency used, but by the selective action set forth, is much reduced and ordinarily ranges from two or three seconds for very high frequencies, 50,000 kilocycles and above to one or two minutes for lower frequencies, i. e., 10,000 kilocycles, during which short period of time all insect life is destroyed. This period is insufficient to cause an injury to the grain by the developed temperatures. In treating other materials the periods of treatment may be made materially longer, where conditions are unfavorable for such rapid destruction of insect life, and where the nature of the host material is such that it is not so sensitive to injury by the heat at the higher temperatures and by prolonged exposures required.

My discoveries show that dielectric losses in a grain of wheat or a nutmeat, for example, with low moisture content is less than an impurity which might be embedded within such grain of wheat or nutmeat, e. g., an insect egg or larval form or even an adult. Therefore, if any host material containing such impurities or infestations is exposed to a rapidly changing electrical field the dielectric losses in the tissue of the grain of wheat or nutmeat are less than in the protoplasm infesting the product. Likewise, the eddy currents are less in the wheat kernel than in the insect. Consequently the heating effect is greater in the infesting protoplasm than in the surrounding host material, so that through such dielectric losses in the host material the heating effect in the infesting protoplasm is greatly increased and expedited.

A high frequency method of exterminating predatory insects and their progeny in grain and other similar materials, in order to be practically and economically successful for commercial uses, by which I mean the treatment of infested materials in large amounts, which materials may offer a greater or less degree of resistance to the action of the high frequency oscillations, must be operative to treat the material at a rapid rate and to thoroughly penetrate the material so as to kill all forms of the insect life therein, i. e., adults, larvae and pupae, whether on the surface or embedded in the material, without drying out, charring or otherwise injuring the material or unduly reducing its volume by excessive elimination of moisture content. In the treatment of grain, for example, because of the resistance of mass grain to penetration, it is not so difficult to destroy those adult insects lying upon the surfaces of a small number of grain kernels by exposing them to the action of high frequency oscillations generated by an ordinary commercially available type of broadcast apparatus, but it is difficult and impossible by the use of such an apparatus to destroy adult insects lying between kernels of a grain mass or to destroy those embryonic forms of insect life which lie within the kernels of the individual grains and are shielded and protected thereby from external forces, without physical injury to or in any manner impairing the quality of the grain. Special means, such as my invention provides, is necessary for this purpose. No method of extermination which does not completely destroy all forms of insect life, live as well as dormant, throughout the grain without injury to the grain can be commercially employed, since, if, in the treatment of any large quantities of grain, only the adults are destroyed, the other forms of insect life will become active in a short time, and the treatment process must be frequently repeated merely to keep the grain free from active life alone, and since if the method of treatment is in any manner injurious to the grain the market value of the grain is reduced. It is essential, therefore, that the method employed be free from both objections in order to be successful and economically practicable.

I overcome these objections, as before set forth, by subjecting the material to the effects of the high frequency oscillations of a vacuum tube generator of high capacity type sufficient to produce oscillations of the required electromotive force, and by adjusting the circuit to control and regulate the frequency and intensity of the oscillations to suit the specific resistance of the host material treated, or by adjusting the circuit to the capacity of the field, and to effect resonance between the insect life and the frequency of the impressed oscillations, whereby the impedance of the host material is overcome and a thermally selective or differential produced as between the host material and the animal protoplasm existing therein. By this means the temperature induced by eddy current and allied effects in the protoplasm increases very rapidly to the lethal degree while that in the host material increases very slowly because the electrical conductivity of the former is far greater than that of the latter.

It will thus be understood that by regulating the intensity and frequency of the oscillations to overcome the impedance of the host material and to simultaneously cause the insect life to rapidly respond reactively to the frequency employed, I am enabled to ensure destruction of insect life in all forms in which it exists in the host material before any rise of temperature in the host material sufficient to injure it or impair its quality can take place. In thus destroying all forms of insect life in the host material in one operation the necessity of frequently treating the material is avoided, further depredations within any short period prevented, and economy in treatment secured. By controlling the frequency and regulating the intensity of the field I mean any controlling action or actions obtained by controlling the frequency per se, tuning or otherwise adjusting the circuit to the capacity of the load or field, or adjusting the electrodes, any one, two or all of them, as may be required under different conditions of service.

I am aware of the fact that it has heretofore been proposed to electrically exterminate insects in bulk grain by subjecting grain disposed between sets of spark gap electrodes to the action of a multitude of disruptive discharges forming a field of conductive currents due to the breaking down or rupture of the air in the field gap between the sets of electrodes. Such a method of treatment may be successfully used under certain conditions, as for example in the destruction of insects in rolled oats or other milled cereals, where the granules are packed in pasteboard boxes or cartons, but cannot be successfully used in the treatment of whole wheat or other whole free grain in bulk without liability of injury to the grain, or where large quantities of the grain in bulk are stored, as in grain storage elevators and graineries, where the use of disruptive discharge currents due to dust particles in the grain and atmosphere would be attended with danger because of the liability of explosions and fire hazards. It is well known that the tendency of disruptive discharge currents in the presence of non-conducting bodies in the discharge field is to pass around rather than to penetrate such bodies, so that this method of treatment in order to overcome the resistance of the individual grains to penetration in order to destroy the eggs and other insect life embedded therein would require such a degree of exposure as to render it practically impossible to maintain a proper temperature differential between the protoplasm exposed on the surfaces of the body of grain and that contained between the individual grains and in the individual grains themselves, with the result that in order to bring the shielded protoplasm in the grain to lethal temperature overheating of the grain and its excessive drying out or surface charring, or actual carbonization, would be liable to occur. Such a method of treatment, therefore, would be unsafe and ineffective to destroy insect life in all forms in which it exists in the grain, and therefore would be commercially impracticable, even if partially successful, because of the required frequent treatments of large quantities of grain at heavy expense in order to keep it free from insect life.

I am also aware of the fact that, following the discoveries made by Tesla, Hengstenberg, Esau, d'Arsonvale, Schliephake, Hosma, Schereschewsky and others that high frequency electrical radiations produce heating effect, experimental laboratory tests have been made by eminent entomologists for the purpose of determining the lethal effect of such high frequency oscillations on insects, in which tests small numbers of insects, placed in glass tubes, arranged in a high frequency field between electrodes, were subjected to the action of high frequency oscillations produced by the action of an ordinary broadcasting apparatus using a 50 watt tube and giving a wave length of about 25 meters with a frequency of about 12,000,000 cycles per second. Published accounts of these experiments stated that the experiments demonstrated that insects so exposed could be killed within certain periods of time by the action of the high frequency oscillations generated by the low capacity generator employed, but that time did not permit a thorough study of larval forms although it was understood that more time would be required to kill larvae than to kill insects. Such experimental methods, however, were not directed to the treatment of insects in grain or other material in bulk and could not be practically employed for this purpose. In similar tests made, at my request, and at an early stage in the development of my invention, prior to the filing of the present patent application, by Dr. W. R. Whitney, director of the General Electric research laboratory at Schenectady, in which tests a broadcast apparatus employing a 50 watt tube and operating at a wave length of 24 meters was used, it was found that while naked insects could be readily killed when exposed to the action of radio oscillations of such frequency and while insects on the surfaces of small amounts of grain exposed to radiations at such frequency could also be killed, the eggs and larvae of the insects were not destroyed. Reports of tests made at much later dates by Dr. Whitney (Dr. Whitney's Radio Address of Jan. 1, 1932, publication News Bureau General Electric Co., Schenectady, and article on page 392 Popular Mechanics of Sept., 1932), showed that while surface insects in treating small amounts of grain were killed the dormant life of their eggs was not affected and that in a few days baby insects hatched out in the treated grain. "And so", concluded Dr. Whitney, as quoted in the magazine article, and in line with what was stated by him in his published previous radio address, "the real problem is not solved".

My invention, on the contrary, provides a method and apparatus whereby insect life in all forms, from eggs to adults, both on the surfaces of and between the grains and embedded in the kernels of the grains, even where large amounts of grain are treated at a time, may be destroyed with absolute certainty in a short period of time and at such a low cost as to make available a means for use in treating grain in large quantities so as to reduce the number and time periods between treatments of stored grain and prevent the huge losses now sustained by graineries, elevators and grain handlers generally as a result of insect depredations.

The method and apparatus set forth, because of its efficiency and rapidity in destroying insect life in any and all forms in which it may exist, without injury to grains, vegetation or other host materials subject to injury by heat, may be employed for the treatment of infested grains or cereals in graineries, warehouses, railway and other cars or various containers, by the provision of an oscillation generator constructed and operating in accordance with my invention. It may also be used for treating peas, beans, or other hulled vegetables, or growing vegetables or plants, by the use of apparatus which may be employed for treating the vegetables or plants in receiving containers or in the field. Cotton or other plants may be treated for destruction of the boll weevil, and infested materials other than vegetable may be treated by suitable apparatus embodying the principles of my invention and particularly provided for the purpose. In all cases the infested material will be placed in the zone or field of the rapid electrical oscillations so that the temperature of the insects, due to electric currents induced in them, wil be elevated to the point or points where they will succumb, most generally between 120° and 140° F., which may be effected by the controlled action afforded by my invention, without inducing a temperature in the material itself which would injure it for planting or adversely affect it for food purposes or damage it in any other manner.

A great advantage of this method is that it is simply and easily carried out, and is inexpensive in operation, and does not require the use of expensive machinery, and that it is rapid in its action, allowing a large amount of material to be treated within a given time, and under proper conditions it has no deleterious effect whatever upon the material treated. Hence it may be employed for destroying insect life in foods or plants, without changing or impairing the quality of the food, or causing injury to plant life on account of its sap content or the diminution of the weight of grain through the driving off of its moisture content, the time period of treatment under the controlled action afforded by my invention to overcome the specific resistance of the material treated being insufficient to cause any appreciable drying out of the material. The method and apparatus may also be employed with great advantage for treating manufactured products of all kinds, as manufactured cotton or woolen goods, cereals and the like, either in bulk or packed, as the high frequency magnetic waves will effectually penetrate the same and destroy all insect life therein, without danger to goods or explosion or fire hazards. The apparatus may, of course, be either in the form of permanent installations at graineries or other plants or institutions or of portable type, for use in gardens or agricultural fields or other places where portable plants may be employed. Graineries, elevators and various kinds of cars, bins or containers for holding the goods may be modified in construction by building the generator electrodes therein, so that either fixed or portable generators may be used in connection therewith for carrying out the treatment.

Figure 5:
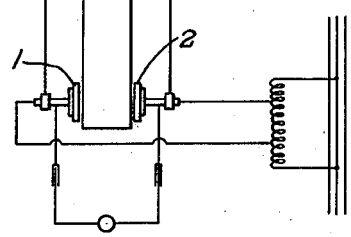

It is to be understood that instead of treating the material while it is in course of transit by a high frequency field which is relatively fixed, the opposite may be the case, that is to say, the material may be maintained in a stationary position in a receptacle 6b similar to receptacle 6a while the field is moved along the same, or relatively thereto, as by raising and lowering the platens by a hoisting device 13 and suitably insulated cables or connectors 14, as shown in Fig. 5.

A type of high capacity, that is to say, high voltage apparatus which I have used for both experimental and practical work in the extermination of weevils and other like insects in grain and other materials may be briefly described as follows:

Three phase, 60 cycle, 4000 volts electric energy is transformed to 440 volts for double wave rectification. Six rectifying vacuum tubes are used, two for each of the three phases. Auto transformers are used in connection with step-up transformers for elevating the alternating current potential to the rectifying tubes. Thus unidirectional current at from 6000 to 9000 volts is supplied to the plate circuit of the oscillating tubes of the push-pull circuit disclosed, suitable condensers and reactors, as shown, being employed. With certain types of three-element oscillating tubes the platens of the treater may be connected through suitable condensers to the plate circuit of the oscillators. With certain other types of oscillating tubes, for example, the standing wave type of tube, the platens of the treater may be connected directly to the grid circuit through suitable coupling coils, thence through the transmission line to the treater. Means are provided relatively adjusting the platens 1 and 2, as set forth, for varying the intensity of the magnetic field and/or properly tuning the load circuit and/or controlling the frequency supplied by the high capacity generator employed to that best suited to the impedance of the particular material under treatment so that the maximum effectiveness of the oscillatory energy at the frequency employed will be impressed on the platens and expended in the work to be performed. The oscillating equipment has a nominal capacity of about 20,000 watts and operates at a frequency of about forty-two million cycles per second. The vacuum tube is about 16' in length overall and about 6" in diameter and is composed of copper tubing to each end of which are attached three element vacuum tubes. Water and compressed air are used as cooling agents for the oscillation tube, likewise water is used as a cooling agent for the six rectifying tubes. The control equipment operates on single phase 60 cycle, 220 volt service. This service is also used for heating the filaments of the oscillating tubes.

The following are a few of many hundreds of tests which I have made with apparatus of the indicated character for the extermination of insects in grain and other host materials of various kinds and under various conditions of field strength between the platens of the treater, and various periods of exposure with material both in motion and while stationary:

| Time exposure, seconds | Thermal amperes | Plate amperes | Oscillator plate volts | Oscillator grid amps. | Temperature of grain | | Number of weevils used | Number of weevils killed |
| --- | --- | --- | --- | --- | --- | --- | --- | --- |
| | | | | | Before treatment, degrees F. | After treatment, degrees F. | | |
| 5 | 12.5 | 7 | 8800 | .7 | 88 | 120 | 13 | 13 |
| 5 | 12.5 | 5.5 | 7800 | .8 | 86 | 125 | 10 | 10 |
| 6 | 20 | 5.5 | 9100 | 1.0 | 86 | 131 | 6 | 6 |
| 3 | 8.5 | 5.5 | 7000 | .7 | 84 | 138 | 10 | 10 |
| 3 | 10 | 8 | 8000 | .8 | 87 | 140 | 9 | 9 |
| 9 | 16.5 | 5.4 | 7800 | .45 | 86 | 138 | see note 1 | |
| 5 | 12.5 | 6 | 7800 | 1.0 | 86 | 142 | see note 2 | |

Note 1.—Untreated grain highly infested with weevil. All live weevil killed by treatment. No indications of further weevil development 25 days later.

Note 2.—Untreated grain highly infested with weevil. All live weevil killed by treatment. No indications of further weevil development two months later.

Figure 4:
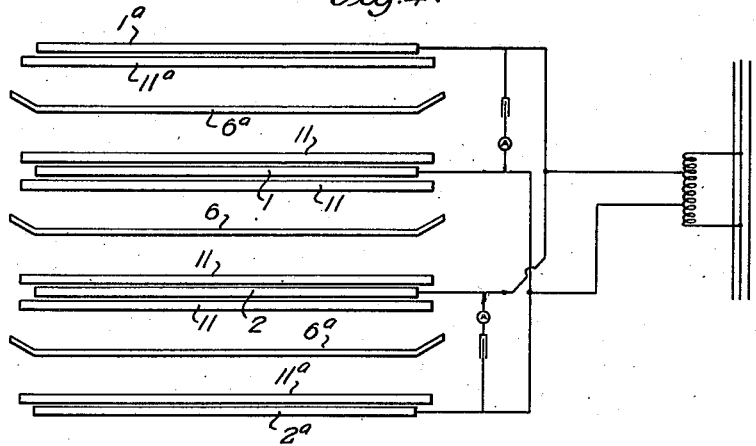
Figs. 4, 5 and 6 are views showing other modifications.
Figure 6:
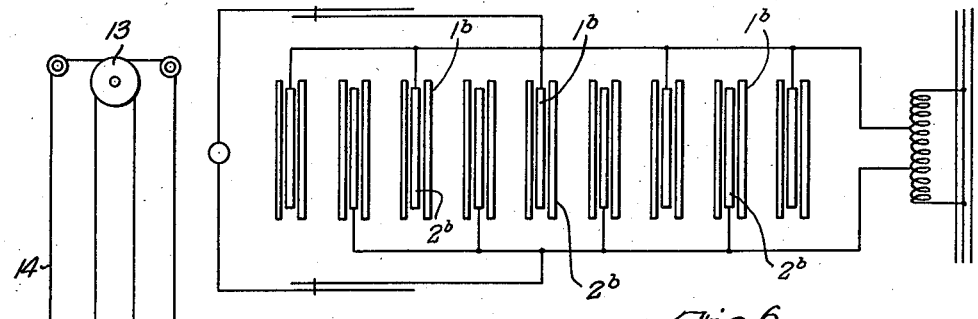

While the structural organizations and method steps and frequency ranges herein set forth for carrying the invention into practical effect may be effectively employed, it is to be understood that the invention is susceptible of various changes or modifications without departing from the principle or sacrificing any of the advantages of the invention, and hence I reserve the right to use all such changes from the particular apparatus structure and method steps disclosed for purposes of exemplification as fairly fall within the spirit and scope of the appended claims. I may, for example, so construct and arrange the platens 1 and 2 with respect to additional platens, as by placing other platens 1a and 2a above and below and in spaced relation to the platens 1 and 2, as shown in Fig. 4, that the magnetic waves emanating from the platens will be effective for action on materials in spaces above platen 1 and below platen 2, as well as in the space 5, so that a plurality of insect infested articles or streams of material on belts or other conveyors or supports 5a may be simultaneously treated and certain magnetic wave losses prevented. There might also be used a type of apparatus arranged somewhat as a cotton gin is arranged, as shown in Fig. 6, with a multiplicity of platens or electrodes 1b and 2b shaped like circular saws spaced just wide enough to allow the material to pass through the spaces between the electrodes. If therefore the platens were enclosed in micarta or plate glass, and arranged in this fashion, the capacity and efficiency could be enormously increased by dividing the grain into thin layers. We could in the design of such a machine provide for the passing and re-passing of the grain through various stages of exposure with respect to the time element and finally deliver the grain to a separator where all adult insects which have been killed would be automatically separated from the grain.

What I claim is:—

1. The method of treating insect infested material in bulk for the destruction of insect life in all forms therein, which consists in disposing the host material in an electrostatic field between spaced electrodes of a high frequency oscillation valve generator, interposing an insulating heat absorbing shield in the field between and in spaced relation to the material and electrodes, and then generating by means of said generator and passing through said field, shield and material high frequency electrical oscillations of a frequency and intensity regulated with regard to the conductivity of the insect life and impedance of the host material to produce lethal heat in such insect life within a time period below that required to injuriously heat the host material.

2. The method of treating insect infested material for the destruction of insect life in all forms therein, which consists in subjecting the host material in bulk to the action of high frequency electrical oscillations of an oscillation valve generator of a frequency and intensity regulated with regard to the conductivity differential between the insect life and host material and the impedance of the latter to induce in all forms of such insect life on the surface of and within the grain a lethal temperature of from 110° to 150° F. without impairing the viability of the material.

3. The method of treating insect infested material in bulk for the destruction of all forms of insect life therein, which consists in subjecting the host material to the action of high frequency electrical oscillations of an oscillation valve generator of a frequency and intensity regulated with regard to the conductivity differential between the insect life and host material to induce in all forms of such insect life on the surface of and within the grain a lethal temperature between 116° F. and 125° F. without impairing the viability of the material.

4. The method of treating insect infested material in bulk for the destruction of insect life in all forms therein, which consists in disposing the material to be treated in the space field between terminal electrodes of a high capacity oscillation valve high frequency generator circuit adjusted to balance the capacity of the load in the field, disposing in the field in spaced relation to the material and terminals shields electrically insulating the material from the terminals, and then by means of such circuit generating and passing through the insulation and material high frequency electrical oscillations of a frequency and intensity such as to overcome the sum of the impedance of the load and shields and penetrate the material throughout and to induce by eddy current effect lethal heat in the insect life.

5. An apparatus for destroying insect life in all forms in insect infested material, comprising means for holding the material in bulk to be treated, a high frequency electrical oscillation valve generator circuit of a capacity suited for generating oscillations of a frequency and intensity regulated to overcome the impedance of the material and to produce lethal heat in the insect life therein, said circuit including electrodes forming an electrostatic field in which said holding means is arranged, and means for controlling the circuit to vary the frequency and intensity of the oscillations to secure an optimum frequency best suited to overcome the impedance and secure resonance of the insect life.

6. An apparatus for destroying insect life in insect infested material, comprising means for holding in bulk the material to be treated, and an oscillation valve generator circuit operative for generating oscillations of a frequency and intensity to overcome the impedance of the material and produce lethal heat in the insects therein, said circuit including an electrical capacity and a reactance in parallel and electrodes forming a condenser field in which the holding means is arranged.

7. An apparatus for destroying insect life in all forms in insect infested material, comprising means for holding the material to be treated, a short wave high capacity oscillation generator circuit operative for producing oscillations of an order and intensity to overcome the impedance of the material and penetrate the same and produce lethal heat in the insects therein, electrodes included in said circuit and forming an electrostatic field in which said holding means is arranged, and means in said circuit for controlling the frequency so as to produce an optimum frequency having the working characteristics described.

8. An apparatus for destroying insect life in all forms in insect infested material, comprising means for holding in bulk the material, an ultra-short-wave oscillation valve generator circuit operative for producing high frequency electrical oscillations of a frequency and intensity to overcome the impedance of the material and produce lethal heat in the insects therein, said circuit including an electrical capacity and a reactance in parallel and electrodes forming a condenser field in which the holding means is arranged.

9. An apparatus for destroying insect life in all forms in insect infested material, comprising a suitable high frequency electrical oscillation valve generator having spaced field electrodes, means for supporting the material to be treated in the field between said electrodes, means for adjusting said electrodes to regulate the intensity of the field, and insulating shields disposed in the field between the supporting means and the electrodes and in spaced relation thereto.

10. An apparatus for destroying insect life in all forms in insect infested material, comprising spaced electrodes forming an electrostatic field, means for supporting the material in said field, a high frequency oscillation valve generator circuit including said electrodes, said circuit being operative for producing in the field high frequency oscillations of a frequency and intensity such as to penetrate the material and produce lethal heat in the insect life therein, and means in said circuit for adjusting the same with relation to the impedance of the material in the field and regulating the frequency to secure an optimum frequency for thorough penetration of the material and rapid reaction of the insects to the working action of the induced current in the field to raise the temperature of the insects to a lethal degree before the temperature of the material is raised to an injurious temperature.

11. An apparatus for destroying insect life in insect infested materials, comprising a suitable high frequency electrical oscillation valve generator circuit having spaced electrodes forming a high frequency field, a holder for the material disposed in said field, and insulating shields of heat absorbing material disposed in the field between and in spaced relation to said holder and the electrodes.

12. An apparatus for destroying insect life in all forms in insect infested grain material, comprising a plurality of sets of longitudinally spaced electrostatic field electrodes, means for supporting the material to be treated in the field spaces and effecting relative longitudinal movement between the same and the sets of electrodes, a high frequency oscillation valve generator circuit including the electrodes and adjusted to the impedance of the material under treatment in the field, said circuit being operative to produce high frequency oscillations of an order and intensity to penetrate the material and by reaction of the insect life therein to produce lethal heat in said insect life, and shields of insulating material disposed in the fields between the supporting means and the electrodes and in spaced relation thereto.

13. The method of treating insect infested grain which comprises subjecting the grain to an electric field pulsating at a frequency of at least forty million vibrations a second.

14. The method of treating grain for the extermination of insect life therein, which consists in disposing grain in a high frequency electric field gap, and subjecting the grain in such field gap to the action of ultra-short electric waves.

15. The method of treating insect infested material for the destruction of all forms of insect life therein, which consists in subjecting such material in bulk to a high frequency electric field vibrating at a frequency of approximately 55,000,000 cycles per second.

16. The method of treating insect infested material for the destruction of all forms of insect life therein, which consists in subjecting such material in bulk to the action of high frequency electrical oscillations of a selected optimum frequency between 40,000,000 cycles and 100,000,000 cycles per second.

17. The method of treating insect infested material for the destruction of all forms of insect life therein, which consists in disposing the material in a holder in a field space between the electrodes of a high frequency oscillation valve generator circuit, subjecting the material in the field to high frequency oscillations of a frequency to induce in such insect life lethal heat without injury to the host material, and interposing between the electrodes and the holder an insulating barrier against the passage of conduction currents.

18. The method of destroying insect life in insect infested grain, seed or like materials, which consists in subjecting the material in bulk to the space-field effect of high frequency electrical oscillations of an oscillation valve generator of a periodicity of the order of fifty thousand kilocycles or more while producing relative motion between the material and such field.

19. The method of destroying insect life in insect infested grain, seed and like materials, which consists in subjecting the material in bulk and when in transit to the space-field effect of high frequency electrical oscillations of an oscillation valve generator of a periodicity of the order of fifty thousand kilocycles or more.

20. The method of destroying insect life in insect infested grain, seed or like materials, which consists in subjecting the material in bulk to periodical space-field effects of high frequency electrical oscillations of an oscillation valve generator of a frequency of the order of fifty thousand kilocycles or more.

21. The method of destroying insect life in insect infested materials, which consists in subjecting bulk quantities of the infested host material in a suitable holder to high frequency oscillations of a generator circuit producing nondisruptive oscillations of voltage and frequency values so adjusted with regard to the relative conductivity values of the bulk of the host material under treatment and the various forms of insect life therein as to rapidly overcome the sum of the impedance of the insect life and host material and to produce a changing electrical field of such rapidly changing order with respect to such conductivity differentials as to effect dielectric losses in the host material less than that in the insect life to secure through eddy current effect and resonance response of the insect life to the employed frequency a more rapid and greater heating effect in the latter than in the former and the heating of the insect life to a lethal temperature without raising the temperature of the host material to an injurious degree.

22. The method of destroying insect life in insect infested materials, which consists in subjecting bulk quantities of the infested host material in a field space between electrodes to high frequency oscillations of a generator circuit producing nondisruptive oscillations of voltage and frequency values so adjusted with regard to the relative conductivity values of the bulk of the host material under treatment and the various forms of insect life therein as to rapidly overcome the sum of the impedance of the insect life and host material and to produce a changing electrical field of such rapidly changing order with respect to such conductivity differentials as to effect dielectric losses in the host material less than that in the insect life to secure through eddy current effect and resonance response of the insect life to the employed frequency a more rapid and greater heating effect in the latter than in the former and the heating of the insect life to a lethal temperature without raising the temperature of the host material to an injurious degree, and shielding the material during treat- 23. An apparatus for destroying insect life in insect infested grain, seed or like materials, comprising a high frequency electrical oscillation valve generator having spaced successive sets of spaced electrodes forming successive high frequency shields, a conveyor for supporting and conveying the material through said fields and between said electrodes, and insulating shields in the fields between the material and the electrodes for shielding the material from conduction currents.

24. An apparatus for destroying insect life in insect infested material, comprising a high frequency electrical oscillation generator having spaced field electrodes, a holder for supporting the material to be treated in the field between said electrodes, and shields of dielectric material disposed between the electrodes and the holder.

25. An apparatus for destroying insect life in insect infested material, comprising a high frequency electrical oscillation generator having spaced field electrodes, a holder for supporting the material to be treated and moving the same through said field, and shields of dielectric material disposed between the electrodes and the holder.

26. An apparatus for destroying insect life in insect infested material, comprising a high frequency electrical oscillation generator having a plurality of longitudinally spaced sets of spaced field electrodes, a holder for supporting the material to be treated and transporting the same through the fields between the sets of electrodes, and insulating shields of dielectric material disposed between the material and the electrodes.

27. An apparatus for destroying insect life in insect infested grain, seed or like materials, comprising a high frequency electrical oscillation valve generator having spaced successive sets of spaced electrodes forming successive high frequency fields, a conveyor for supporting and conveying the material through said fields and between said electrodes, and means in the field between the material and the electrodes for shielding the material from conduction currents.

28. An apparatus for destroying insect life in insect infested materials, comprising a high frequency electrical oscillation generator having spaced electrodes forming an intervening high frequency field, and a conveyor for supporting and conveying the material through said field between said electrodes, and insulating shields between the conveyor and the electrodes.

29. An apparatus for destroying insect life in insect infested grain, seed or like materials, comprising a high frequency electrical oscillation valve generator having spaced successive sets of spaced electrodes forming successive high frequency fields, a conveyor for supporting and conveying the material through said fields and between said electrodes, and means in the field between the material and the electrodes for shielding the material from conduction currents.

30. The method of destroying insect life in insect infested grain, seed or like materials, which consists in conducting the material in bulk through a course of transit, and at successive points along said course subjecting the material to the space field effect of high frequency electrical oscillations of an oscillation valve generator of a frequency of ten thousand kilocycles or more.

31. The method of destroying insect life in insect infested grain, seed or like materials, which consists in conducting the material in bulk through a course of transit, subjecting the material at points along said course between sets of electrodes to the successive field effects of high frequency electrical oscillations of an oscillation valve generator, and interposing in each field between the material and the electrodes non-conducting shields.

32. The method of treating insect-infested material in bulk for the destruction of insect life in all forms therein, which consists in subjecting the material to the action of short waves from a suitable generator of a frequency and voltage regulated to kill all forms of the insect life therein.

33. The method of treating insect-infested material in bulk for the destruction of insect life in all forms therein, which consists in placing the material in bulk in a suitable carrier, disposing the carrier between terminals connected in a high-frequency generator circuit, producing relative motion between the carrier and the field, adjusting the voltage and frequency of said generator to produce an electrostatic field between said terminals and thereby subjecting the material in the carrier to the action of the electrostatic waves of a frequency and voltage to penetrate the material throughout and to kill all forms of insect life therein.

34. The method of destroying insect life in all forms in infested materials, which consists in disposing the infested materials in bulk in an electrostatic field and subjecting the material in said field to the action of short waves of an oscillation generator of a frequency and voltage, regulated with regard to the conductivity of the insect life and the material, to rapidly penetrate the material and raise the temperature of the insect life therein to the lethal degree.

35. An apparatus for destroying insect life in all forms in insect-infested material comprising, a carrier for the infested material, electrodes forming an electrostatic field in which the carrier is arranged, and a high-frequency generator circuit including said electrodes, said circuit being adjustable with respect to the impedance of the material under treatment and operated for producing high-frequency electrical oscillation of an order and intensity to penetrate the material and to kill the insect life therein.

JESSE H. DAVIS.